United States Patent
Tahon et al.

(10) Patent No.: US 7,554,101 B2
(45) Date of Patent: Jun. 30, 2009

(54) RADIATION IMAGE PHOSPHOR OR SCINTILLATOR PANEL

(75) Inventors: Jean-Pierre Tahon, Langdorp (BE); Carlo Uyttendaele, Mortsel (BE)

(73) Assignee: Agfa HealthCare, Mortsel (BE)

( * ) Notice: Subject to any disclaimer, the term of this patent is extended or adjusted under 35 U.S.C. 154(b) by 0 days.

(21) Appl. No.: 11/807,533

(22) Filed: May 29, 2007

(65) Prior Publication Data
US 2008/0290296 A1 Nov. 27, 2008

(30) Foreign Application Priority Data
May 22, 2007 (EP) .................. 07108598

(51) Int. Cl.
*G03B 42/08* (2006.01)
(52) U.S. Cl. .................................. 250/484.4
(58) Field of Classification Search ............... 250/484.4
See application file for complete search history.

(56) References Cited

U.S. PATENT DOCUMENTS

| | | | | |
|---|---|---|---|---|
| 3,720,508 A | 3/1973 | Brock et al. | ............... | 75/147 |
| 3,787,249 A | 1/1974 | Brock et al. | ............... | 148/115 |
| 3,891,852 A * | 6/1975 | Bollen et al. | ............... | 250/391 |
| 4,235,682 A | 11/1980 | Schneeberger et al. | ......... | 204/35 |
| 4,791,009 A * | 12/1988 | Arakawa et al. | ............... | 427/64 |
| 6,501,008 B1 | 12/2002 | Nevins et al. | ............... | 800/298 |
| 6,870,167 B2 | 3/2005 | Iwabuchi | ............... | 250/484.4 |
| 6,967,339 B2 | 11/2005 | Leblans et al. | ........... | 250/484.1 |
| 7,037,640 B2 | 5/2006 | Koninckx et al. | ............... | 430/496 |
| 7,081,631 B2 | 7/2006 | Kohda | ............... | 250/484.4 |
| 7,193,225 B2 | 3/2007 | Maezawa et al. | ......... | 250/484.4 |
| 2003/0104245 A1 * | 6/2003 | Bergh et al. | ............... | 428/690 |
| 2005/0023485 A1 * | 2/2005 | Koninckx | ............... | 250/484.4 |

FOREIGN PATENT DOCUMENTS

EP 1 065 523 1/2001

* cited by examiner

*Primary Examiner*—David P Porta
*Assistant Examiner*—Mark R Gaworecki
(74) *Attorney, Agent, or Firm*—Joseph T. Guy; Nexsen Pruet, LLC

(57) ABSTRACT

In favor of adhesion between phosphor layer and support in a radiation image phosphor or scintillator panel comprising as an arrangement of layers, in consecutive order, a support, a precoat layer and a phosphor or scintillator layer having needle-shaped phosphor or scintillator crystals, said precoat layer comprises as a binder an organic cross-linkable monomer, oligomer, polymer or a mixture thereof and a pigment in a weight ratio of pigment to binder in the range from 1/10 to 10/1.

18 Claims, No Drawings

RADIATION IMAGE PHOSPHOR OR SCINTILLATOR PANEL

CROSS-REFERENCE TO RELATED PATENT APPLICATIONS

This application claims the benefit of European Application No. 07108598.9 filed May 22, 2007, which is also incorporated by reference.

FIELD OF THE INVENTION

The present invention is related with a binderless radiation image phosphor or scintillator panel provided with a vapor deposited phosphor or scintillator layer upon a support, modified in order to provide an excellent adhesiveness, less cracking in the phosphor layer after ending the vaporization process and after frequent exposure and read-out, resulting in an improved image quality after use in digitized image processing.

BACKGROUND OF THE INVENTION

Radiation image recording systems wherein a radiation image is recorded on a phosphor or scintillator screen by exposing the screen to image-wise modulated penetrating radiation are widely used nowadays.

In the case of storage phosphor screens a recorded image is reproduced by stimulating an exposed photostimulable phosphor screen by means of stimulating radiation and by detecting the light that is emitted by the phosphor screen upon stimulation and converting the detected light into an electrical signal representation of the radiation image.

In several applications as e.g. in mammography, sharpness of the image is a very critical parameter. Sharpness of an image that has been read out of a photostimulable phosphor screen not only depends on the sharpness and resolution of the screen itself but also on the resolution obtained by the read-out system which is used.

In conventional read out systems used nowadays a scanning unit of the flying spot type is commonly used. Such a scanning unit comprises a source of stimulating radiation, e.g. a laser light source, means for deflecting light emitted by the laser so as to form a scanning line on the photostimulable phosphor screen and optical means for focusing the laser beam onto the screen.

Examples of such systems are the Agfa Diagnostic Systems, denominated by the trade name ADC 70 and Agfa Compact. In these systems photostimulable phosphor screens which comprise a BaFBr:Eu phosphor are commonly used.

The resolution of the read-out apparatus is mainly determined by the spot size of the laser beam. This spot size in its turn depends on the characteristics of the optical light focusing arrangement. It has been recognized that optimizing the resolution of a scanning system may result in loss of optical collection efficiency of the focussing optics. As a consequence an important fraction of the laser light is not focused onto the image screen. A severe prejudice exists against the use of systems having an optical collection efficiency of the focusing optics which is less than 50% because these systems were expected not to deliver an adequate amount of power to the screen in order to read out this screen to a sufficient extent within an acceptable scanning time. A solution has therefor been sought and found as disclosed in EP-A 1 065 523 and its corresponding U.S. Pat. No. 6,501,088. Therein use has been made of a method for reading a radiation image that has been stored in a photostimulable phosphor screen comprising the steps of scanning said screen by means of stimulating radiation emitted by a laser source, detecting light emitted by said screen upon stimulation, converting detected light into an electrical signal representation of said radiation image, wherein said photostimulable phosphor screen comprises a divalent europium activated cesium halide phosphor wherein said halide is at least one of chloride and bromide and said laser beam is focused so that the spot diameter of the laser spot emitted by said laser, measured between $1/e^2$ points of the gaussian profile of said laser beam is smaller than 100 µm. Object of that invention to provide a method and a system for reading a radiation image that has been stored in a photostimulable phosphor screen was resulting, besides in a method and a system for reading a radiation image stored in a photostimulable phosphor screen having a needle-shaped storage phosphor layer, in a method and system yielding a high sharpness.

In U.S. Pat. No. 2004/0149929 a radiation image storage panel has been disclosed, composed of a support, a phosphor matrix compound layer covering a surface of the support at a coverage percentage of 95% or more, and a stimulable phosphor layer (which is composed of multiple prismatic stimulable phosphor crystals standing on the phosphor matrix compound layer) formed on the phosphor matrix compound layer, thereby providing a high peel resistance between the support and the stimulable phosphor layer, a high sensitivity, and a reproduced radiation image of high quality.

However, in a radiation image transformation panel, in order to attain the desired radiation absorbing power the needle shaped europium doped cesium halide storage phosphor must be formed in a layer having a thickness of about 80-800 µm. Since the parent compound of the photostimulable phosphor consisting of alkali halide compound, such as CsBr, has a large thermal expansion coefficient of about $50 \times 10^{-6}/°$ K., cracks may appear in such a relatively thick layer so that adhesion of the storage phosphor layer onto the support substrate may become a problem, leading to delamination. Factors having a negative influence onto cracking and delamination are related, besides substrate temperature and changes thereof during the vapor deposition process, with the pressure of inert gas in the vacuum chamber and with presence of impurities, which have a significant influence upon crystallinity of the deposited phosphor layer during said vapor deposition process. In order to solve that problem, a solution has been proposed in JP-A 2005-156411. In that application a first vapor deposited layer was formed onto the substrate, wherein said layer was containing an alkali halide compound with a molecular weight smaller than the parent compound of the photostimulable phosphor. The layer with the vapor deposited stimulable europium doped cesium halide phosphor was further deposited thereupon. Nevertheless as a first layer between substrate and storage phosphor layer is a vapor deposited layer again, same problems were met with respect to cracks and delamination and the expected improvement with respect thereto was not yet is fully obtained.

In U.S. Pat. No. 6,870,167 a process for the preparation of a radiation image storage panel having a phosphor layer which comprises a phosphor comprising a matrix component and an activator component, which comprises the steps of: forming on a substrate a lower prismatic crystalline layer comprising the matrix component by vapor deposition, and forming on the lower prismatic crystalline layer an upper prismatic crystalline layer comprising the matrix component and the activator component by vapor deposition as an arrangement favorable for crystallinity of said upper layer. In favour of adhesion however it has been proposed in U.S.-Application 2005/51736 to make use of spherical shaped phosphors in the lower layer.

When performing vapor deposition techniques in order to prepare phosphor layers onto dedicate substrates, a highly desired substrate material whereupon the scintillator or phosphor material should be deposited is made of glass, a ceramic material, a polymeric material or a metal. As a metal base material use is generally made of metal sheets of aluminum, steel, brass, titanium and copper. Particularly preferred as a substrate is aluminum as a very good heat-conducting material allowing a perfect homogeneous temperature, not only over the whole substrate surface but also in the thickness direction: such heat conductivities are in the range from 0.05-0.5 W/(m·K). Since completely pure aluminum is not easily produced from a point of view of a refining technology, aluminum supports containing other elements in the aluminum alloy like silicon, iron, manganese, copper, magnesium, chromium, zinc, bismuth, nickel and titanium have been used as described in U.S. Pat. Nos. 3,787,249 and 3,720,508, wherein, as in automotive applications, bright anodized aluminum alloys having appearance somewhat similar to buffed stainless steels or to chrome-plated brass are much more economical to the user. Said alloys have markedly improved resistance to oxidation in the temperature range of 440° to 500° C. which results in improved surface appearance after hot rolling and are tolerant to a broader range of solution composition in which they can be bright dipped. Alloys described in U.S. Pat. No. 4,235,682 further exhibit substantially improved brightness after anodizing in sulphuric acid and sealing. Apart from metallic supports, polymeric supports are used, as described e.g. in U.S. Pat. No. 7,081,631, disclosing a radiation image storage panel, comprising a rigid substrate, constituted of a carbon fiber-reinforced plastic (resinous) sheet, which exhibits a radiation absorptivity of at most 20%, and a phosphor layer overlaid on the said rigid substrate, wherein a deflection quantity of the radiation image storage panel, which deflection quantity occurs when the radiation image storage panel, is secured and supported at two sides of the radiation image storage panel, the two sides standing to face each other, and the radiation image storage panel is thus held horizontally, wherein the deflection quantity of the radiation image storage panel is at most 200 µm. In U.S. Pat. No. 7,193,225 a radiation image conversion panel comprises on a support at least one stimulable phosphor layer comprising a stimulable phosphor, wherein the stimulable phosphor layer is a layer of vapor-deposited stimulable phosphor having a thickness of 50 µm to 20 mm, and the support exhibits a thermal conductivity of 0.1 to 20 W/mK, and wherein the support is comprised of plural layers, i.e., a polyimide layer, a carbon fiber plate layer and a polyimide layer in that order, and an uppermost layer of the plural layers exhibits a glass transition temperature of 80 to 350° C.

Apart from rigid supports, the support in U.S. Pat. No. 7,037,640 provides a sheet, web or panel, wherein flexible or flexible-made supports or substrates are selected from the group consisting of metal sheets, plastic sheets, reinforced resin sheets as e.g. carbon fiber reinforced resin, inorganic glass and ceramic sheets.

It should be noted however that in order to perform vapor deposition of two vapor deposited layers as has e.g. been described in U.S. Pat. Nos. 6,870,167 and 6,967,339, or in US-Application 2005/0077479 two different processes in a vapor depositing apparatus are required in order to deposit different raw starting materials in each layer: as it is known that increased dopant amounts in the upper layer lead to a desired higher sensitivity of the storage phosphor screen thus formed, it can be expected that higher dopant amounts lead to enhanced cracking and decreased adhesion of the coated layers.

Besides a good compromise between physical characteristics as roughness of the support and avoiding cracking of the phosphor or scintillator layers, as well as between speed and sharpness properties, it is clear that another physical characteristic as a good adhesion between aluminum support and phosphor or scintillator layer remains an ever lasting demand.

SUMMARY OF THE INVENTION

It is a main object of the present invention to avoid cracking of a vapor deposited phosphor layer having excellent adhesion characteristics between vapor deposited phosphor or scintillator layers having a thickness of 80 µm up to 1000 µm and support layers.

The above-mentioned advantageous effects have been realized by providing a storage phosphor panel having the specific features set out in claim 1. Specific features for preferred embodiments of the invention are set out in the dependent claims.

Following embodiments of the phosphor or scintillator panels according to the present invention are more particularly claimed.

A radiation image phosphor or scintillator panel according to the present invention comprises as a layer arrangement of consecutive layers: a support, a precoat layer and a phosphor or scintillator layer comprising needle-shaped phosphor or scintillator crystals, wherein said precoat layer comprises as a binder an organic cross-linkable monomer, oligomer, polymer or a mixture thereof and a pigment in a weight ratio of pigment to the said binder in the range from 1/10 to 10/1.

In one embodiment according to the present invention, said ratio is in the range from 1/2 to 10/1. In another embodiment according to the present invention, said ratio is in the range from 1/1 to 5/1.

In a particular embodiment in said precoat layer in the panel according to the present invention an organic non-cross-linkable polymer is present too. Higher amounts of non-cross-linkable polymer allow broader ranges of weight ratio amounts of pigment to binder in the said precoat layer, and, more particularly in case of sole presence of such a non-cross-linkable polymer, allow to coat up to higher weight ratio amounts of pigment to binder as has been set forth in EP-Application No. 07 108 598.9, filed May 22, 2007, the priority of which is claimed and the contents of which is incorporated herein by reference.

In the panel according to the present invention, said pigment in the said precoat layer is selected from the group consisting of a powder phosphor, $SiO_2$, a silicate, an aluminate, alumina, alumina hydrate, aluminum trihydroxide, $TiO_2$, a titanate, a borate, a carbonate, a sulphate, a sulfide, a phosphate, an aluminate, ZnO, a clay, a zeolite, $ZrO_2$, a zirconate, carbon black, polymer particles and combinations thereof.

Further in the panel according to the present invention, said powder phosphor in the said precoat layer is a lanthanide doped alkali metal halide phosphor, a lanthanide doped alkaline earth metal halide phosphor, a lanthanide doped oxysulphide of another lanthanide or a combination thereof.

In the precoat layer of the panel according to the present invention, said cross-linkable monomer is selected from the group of monomers consisting of an epoxy, an acrylate, a methacrylate, a silicone, a siloxane, a siloxazane, a urethane, an isocyanate, an anhydride, an oxime, an allyl, a styrenic, a nitrile, an amide, an imide, a vinyl, an aldehyde, an amine, an azine, an epoxide, a quinoline, an active olefin, an imide, a pyridinium, an azolium, an azoline monomer and combinations thereof.

More in particular, in the panel according to the present invention, said organic cross-linkable polymer is selected from the group consisting of cellite, poly-acrylate, poly-methyl-methacrylate, poly-methylacrylate, polystyrene, polystyrene-acrylonitrile, polyurethane, hexafunctional poly-acrylate, poly-vinylidene-difluoride, silane-based polymers, epoxy functionalized polymers and a combination thereof.

The panel according to the present invention, in a particularly advantageous embodiment, is provided with an organic cross-linkable polymer, present in form of a mixture of cellite (cellulose acetobutyrate) and ebecryl (multifunctional acrylate monomers). In another particular embodiment thereof a ratio by weight of cellite to ebecryl is in the range from 5:1 to 1:5 and, in an even more particular embodiment said ratio is in the range from 3:1 to 1:3.

With respect to the support, the panel according to the present invention has a support, selected from the group consisting of aluminum, an aluminum alloy, titanium, a titanium alloy, and a combination thereof.

In another embodiment the panel according to the present invention has a support which is multilayered, comprising a polymeric sublayer besides a layer of aluminum, an aluminum alloy, titanium, a titanium alloy, or a combination thereof. In a particular embodiment thereof said polymeric sublayer is situated farther away from said phosphor or scintillator layer than said layer of aluminum, said aluminum alloy, said titanium, said titanium alloy, or a combination of said metals.

In a particular embodiment, in the panel according to the present invention, said polymeric sublayer is a plastic (resinous) laminate layer or a fiber reinforced resin layer. More particularly said fiber reinforced resin layer is an epoxy resin layer, which is, in one embodiment, a carbon fiber reinforced epoxy resin layer.

In the panel according to the present invention, said needle-shaped phosphor or scintillator crystals, present in a vapor deposited binderless layer, originate from raw materials selected from the group consisting of one or more matrix compound(s), one or more dopant compound(s) and a combination thereof, aligned in parallel and oriented under an angle in a range between 60° and 90° with respect to said precoat layer and wherein as matrix compound(s) alkali metal halide salts and as dopant(s) lanthanides or non-matrix monovalent ions are present.

Further according to the present invention, in the method of preparing a radiation image phosphor or scintillator panel as described above, said precoat layer is coated by a technique selected from the group consisting of roller coating, knife coating, doctor blade coating, spray coating, sputtering, physical vapor depositing, chemical vapor depositing and laminating (whether or not—when heating and pressing—making use of an adhesive, sticking the precoat layer thereby onto the support).

Moreover according to the present invention, in the method of preparing a radiation image phosphor or scintillator panel as described above, said phosphor or scintillator layer is coated by a technique selected from the group consisting of physical vapor deposition, chemical vapor deposition and an atomization technique.

Further advantages and particular embodiments of the present invention will become apparent from the following description, without however limiting the invention thereto.

DETAILED DESCRIPTION OF THE INVENTION

It has been found now that, in order to get good adhesion characteristics for vapor deposited phosphor or scintillator panels deposited onto a support in the preparation of a radiation image screen or panel, it is advantageous to provide said image phosphor or scintillator panels with a layer arrangement of consecutive layers as a support—in most cases an anodized aluminum support—, a precoat layer and a phosphor or scintillator layer comprising needle-shaped phosphor or scintillator crystals, wherein said precoat layer comprises a cross-linkable monomer, an oligomer, a polymer or a mixture thereof and a pigment in a weight ratio of pigment to binder in the range from 1/10 to 10/1 and in that said precoat layer has a thickness of less than 50 µm, preferably in the range from 4 µm up to 20 µm and even more preferably up to ca. 15 µm.

Thermal stability of the precoat layer is very important. As that precoat layer filled with pigments is absorbing heat during the vaporization process, variations in coloration of the precoat layer may appear. In one embodiment the precoat layer may have a yellowish color. More particularly in a layer arrangement with thinner phosphor layers, changes in coloration of the precoat layer may cause differences with respect to screen structure noise between different plates.

According to the present invention use has been made of Kraton®-rubbers from SHELL, The Netherlands, poly vinylidene difluoride (PVDF) from ARKEMA, France, p-xylylene (PARYLENE) from COOKSON, London, United Kingdom, and polystyrene acrylonitrile (PAN) from LURAN, as well as cellulose acetobutyrate (20% solution in tripropylene glycol diacrylate—TPGDA—) known as CAB 551-0.2 from BASF AG, Ludwigshafen, Germany; besides cellulose acetobutyrate, CAB-171-15S and CAB-381-20 (with a higher viscosity) or CAB-381-2 (with a lower viscosity) from EASTMAN CHEMICALS, USA; multifunctional acrylate monomer EBECRYL 170; aliphatic urethane hexaacrylate monomer EBECRYL 1290; and EBECRYL 264 a trade name for an alifatic urethane triacrylate from UCB S.A., Belgium.

For radiation curable dispersions with the dispersion medium comprising or consisting of monomers and/or oligomers, many (co)polymers having good solubility in the dispersion medium were found to be suitable for the polymer backbone of the polymeric dispersant. Copolymeric backbones advantageously consist of no more than 2 or 3 monomer species. Monomers and/or oligomers used to prepare the polymeric dispersant may be any monomer and/or oligomer found in the "Polymer Handbook", Vol. 1+2, 4th edition. Edited by J. BRANDRUP, et al. Wiley-Interscience, 1999.

Suitable examples of monomers, suitable for use in the precoat layer of the panel according to the present invention include: acrylic acid, methacrylic acid, maleic acid (anhydride), acryloyloxybenzoic acid and methacryloyloxybenzoic acid (or their salts); alkyl(meth)acrylates (linear, branched and cycloalkyl) such as methyl(meth)acrylate, n-butyl(meth)acrylate, tert-butyl(meth)-acrylate, cyclohexyl (meth)acrylate and 2-ethylhexyl(meth)acrylate; aryl(meth) acrylates such as benzyl(meth)acrylate and phenyl(meth)-acrylate; hydroxyalkyl(meth)acrylates such as hydroxyethyl (meth)-acrylate and hydroxypropyl(meth)acrylate; (meth) acrylates with other types of functionalities (e.g. oxirane, amino, fluoro, polyethylene oxide, phosphate-substituted) such as glycidyl (meth)acrylate, dimethylaminoethyl(meth) acrylate, trifluoroethyl acrylate, methoxy-polyethyleneglycol(meth)acrylate and tripropyleneglycol(meth)-acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl (meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether and vinyl sulfones; active esters like sulfonate esters, vinylesters of carboxylic acids such as vinylacetate and vinylbutyrate; aldehydes, halogen-substituted aldehyde acids (e.g. mucochloric and mucobromic acids) and dialdehydes (such as succinaldehyde and glutaraldehyde), isocyanate or blocked isocyanates, polyfunctional isocyanates, melamine derivatives, s-triazines and diazines, epoxides, quinolines (as e.g. esters of 2-alkoxy-N-carboxy-dihydroquinoline), active olefins having two or more active bonds, carbodiimides, pyridinium salts (as e.g. N-carbamoylpyridinium salt), isoxazolium salts and oxazolines, as well as active halogen compounds.

In the presence of one or more cross-linkable monomer(s), oligomer(s), polymer(s) or a mixture thereof in the precoat layer, presence of an initiator in order to provide ability for cross-linking is not recommended as coloration, and more in particular "yellowing" of the layer, is not desired.

As pigments use has advantageously been made of a pigment selected from the group consisting of a powder phosphor (as e.g. $Gd_2O_2S$:Tb known as a luminescent prompt emitting phosphor used in intensifying screens), and of inorganic pigments well-known in the art such as silica, talc, clay, hydrotalcite, kaolin, diatomaceous earth, calcium carbonate, magnesium carbonate, basic magnesium carbonate, aluminum oxide (alumina), alumina hydrate, aluminosilicate, aluminum trihydroxide, titanium oxide, zinc oxide, barium sulfate, calcium sulfate, zinc sulfide, satin white, boehmite (alumina hydrate), zirconium oxide or mixed oxides. Aluminum oxide (alumina) may be used, as known from several patents, as e.g. from U.S. Pat. Nos. 4,780,356; 5,041,328; 5,182,175; 5,266,383; and EP-A's 0 835 762 and 0 972 650, wherein its applicability in ink receiving layers has been described. Useful pigments, called "fillers" as described in EP-A 1 671 805 may be used as, e.g., silica, talc, clay, hydrotalcite, kaolin, diatomaceous earth, calcium carbonate, magnesium carbonate, basic magnesium carbonate, aluminosilicate (as e.g. a zeolite, being a hydrated metal aluminosilicate compound with well-defined (tetrahedral) crystalline structure), aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides may be used. Two or more inorganic fillers may be used to further improve the layer properties, as e.g. coating quality and adhesion. The inorganic pigment or filler preferably has an average particle size smaller than 0.8 µm, more preferably smaller than 150 nm and most preferably smaller than 20 nm. The inorganic filler preferably has a specific surface greater than 50 m$^2$/g, greater than 200 m$^2$/g, and even greater than 300 m$^2$/g, depending on its particle size. In the panel according to the present invention, use is advantageously made from a powder phosphor, $SiO_2$, a silicate (e.g. an aluminosilicate), an aluminate, alumina, alumina hydrate (such as boehmite), aluminum trihydroxide, $TiO_2$, a titanate (like $BaTiO_3$), a borate, a carbonate (like calcium carbonate, magnesium carbonate), a sulphate (like calcium sulphate, barium sulphate), a sulfide (like zinc sulfide), a phosphate (like e.g. zinc phosphate, known as an anticorrosion pigment, under the trade name NUBIROX®, available from NUBIOLA, Spain, an aluminate, ZnO, a clay, a zeolite, $ZrO_2$, a zirconate, carbon black, polymer particles and combinations thereof. Such a pigment may be white (and reflecting, as e.g. $TiO_2$), or black (and absorbing, as e.g. carbon black).

Alumina hydrates are those known e.g. from EP-A's 0 500 021, 0 634 286, 0 622 244, 0 742 108 and 0 810 101, as well as from U.S. Pat. Nos. 5,624,428 and 6,238,047.

Suitable cationic aluminum oxide (alumina) types include —$Al_2O_3$ types, such as NORTON E700, available from SAINT-GOBAIN CERAMICS & PLASTICS INC., and —$Al_2O_3$ types, such as ALUMINUM OXID C from DEGUSSA; other aluminum oxide grades, such as BAIKALOX CR15 and CR30 from BAIKOWSKI CHEMIE; DURALOX grades and MEDIALOX grades from BAIKOWSKI CHEMIE, BAIKALOX CR80, CR140, CR125, B105CR from BAIKOWSKI CHEMIE; CAB-O-SPERSE PG003 available from CABOT, CATALOX GRADES and CATAPAL GRADES available from SASOL, such as PLURALOX HP14/150; colloidal $Al_2O_3$ types, such as ALUMINASOL™ 100; ALUMINASOL™ 200, ALUMINASOL™ 220, ALUMINASOL™ 300, and ALUMINASOL 520 available from NISSAN CHEMICAL INDUSTRIES or NALCO 8676 available from ONDEO NALCO.

Other useful cationic inorganic pigments or fillers include aluminum trihydroxides such as Bayerite, or —$Al(OH)_3$, such as PLURAL BT, available from SASOL, and Gibbsite, or —$Al(OH)_3$, such as MARTINAL grades from MARTINSWERK GmbH, MARTIFIN grades, such as MARTIFIN OL104, MARTIFIN OL 107 and MARTIFIN OL111 from MARTINSWERK GmbH, MICRAL grades, such as MICRAL 1440, MICRAL 1500; MICRAL 632; MICRAL 855; MICRAL 916; MICRAL 932; MICRAL 932CM; MICRAL 9400 from JM HUBER COMPANY; HIGILITE grades, e.g. HIGILITE H42 or HIGILITE H43M from SHOWA DENKA K.K. Another suitable type of cationic filler is a zirconium oxide such as NALCO OOSS008 available from ONDEO NALCO, an acetate stabilized $ZrO_2$ such as ZR20/20, ZR50/20, ZR100/20 and ZRYS4 trademarks from NYACOL NANO TECHNOLOGIES.

Suitable mixed oxides include SIRAL grades from SSASOL, colloidal metal oxides from NALCO such as NALCO 1056, NALCO TX10496, NALCO TX11678.

A clay, suitable for use as a pigment, may be natural or synthetic. Natural clays are essentially hydrous aluminum silicates, wherein alkali metals or alkaline-earth metals are present as principal constituents. Also in some clay minerals magnesium or iron or both may replace the aluminum wholly or in part. The ultimate chemical constituents of the clay minerals vary not only in amounts, but also in the way in which they are combined or are present in various clay minerals. It is also possible to prepare synthetic clays in the laboratory, so that more degrees of freedom can lead to reproducible tailor made clay products for use in different applications. So from the natural clays smectite clays, including laponites, hectorites and bentonites are well-known. For the said smectite clays some substitutions in both octahedral and tetrahedral layers of the crystal lattice occur, resulting in a small number of interlayer cations. Smectite clays form a group of "swelling" clays which take up water and organic liquids between the composite layers and which have marked cation exchange capacities. From these smectite clays, synthetic chemically pure clays have been produced. Selected synthetic smectite clay additives for the purposes of this invention are e.g. LAPONITE RD and LAPONITE JS, trade mark products of LAPORTE INDUSTRIES Limited, London. Organophilic clays and process for the production thereof have been described in the granted EP 0 161 411. LAPONITE JS is described as a synthetic layered hydrous sodium lithium magnesium fluoro-silicate incorporating an inorganic polyphoshate peptizer. The said fluoro-silicate appears as free flowing white powder and hydrates well in water to give virtually clear and colorless colloidal dispersions of low viscosity, also called "sols". On addition of small quantities of electrolyte highly thixotropic gels are formed rapidly. The said thixotropic gels can impart structure to aqueous systems without significantly changing viscosity. An improvement of gel strength, emulsion stability and suspending power can be observed by making use of it in the said aqueous systems. Further advantages are the large solid surface area of about 350 m$^2$/g which gives excellent adsorption characteristics, its stability over a wide range of temperatures, its unique capability to delay gel formation until desired and its synergistic behavior in the presence of thickening agents. Further, its purity and small particle size ensures an excellent clarity. In aqueous solutions of many polar organic solvents it works as a very effective additive. LAPONITE RD is described as a synthetic layered hydrous sodium lithium magnesium silicate with analogous properties as LAPONITE JS. Laponite clay as a synthetic inorganic gelling agent for aqueous solutions of polar organic compounds has been presented at the Symposium on "Gums and Thickeners", organized by the Society of Cosmetic Chemists of Great Britain, held at Oxford, on Oct. 14, 1969. In Laporte Inorganics Laponite Technical Bulletin L104/90/A a complete review about the structure, the chemistry and the relationship to natural clays is presented. Further in Laporte Inorganics Laponite Technical Bulletin L106/90/c properties, preparation of dispersions, applications and the product range are disclosed. A detailed description of "Laponite synthetic swelling clay, its chemistry, properties and application" is given by B. J. R. Mayes from Laporte Industries Limited.

Advantageously used and well-known as an inorganic pigment is silica, which can be used as such in its anionic form or after cationic surface modification. Silica, suitable for use as a pigment is disclosed in numerous older and more recent patents, e.g. U.S. Pat. Nos. 4,892,591; 4,902,568; 5,073,448; 5,213,873; 5,270,103; 5,989,802 and 6,127,105; EP-A's 0 493 100 and 0 514 633, without however being limited thereto. The silica can be chosen from different types, such as crystalline silica, colloidal silica, amorphous silica, precipitated silica, fumed silica, silica gel, and spherical and non-spherical silica. The silica may contain minor amounts of metal oxides from the group Al, Zr, Ti. Useful types of silica suitable for use as pigments in the precoat layer of the panel according to the present invention include AEROSIL OX50 (BET surface area 50 15 m$^2$/g, average primary particle size 40 nm, SiO$_2$ content>99.8%, Al$_2$O$_3$ content<0.08%), AEROSIL MOX170 (BET surface area 170 m$^2$/g, average primary particle size 15 nm, SiO$_2$ content>98.3%, Al$_2$O$_3$ content 0.3-1.3%), AEROSIL MOX80 (BET surface area 80 20 m$^2$/g, average primary particle size 30 nm, SiO$_2$ content>98.3%, Al$_2$O$_3$ content 0.3-1.3%), or other hydrophilic AEROSIL™ grades available from DEGUSSA-HULS AG, which may give aqueous dispersions with a small average particle size (<500 nm). The colloidal silica's available from BAYER AG, Leverkusen, Germany, under the tradename of KIESELSOL, e.g. KIESELSOL 100, KIESELSOL 200 KIESELSOL 300, KIESELSOL 500 and KIESELSOL 600, having particle sizes of the silica sol particles are in the range from 3 nm to 3 µm, are also very suitable for use in the precoat layer of the panel according to the present invention. Other suitable colloidal silica grades include Ludox grades from GRACE GmbH; "Ludex" silica sols (trademarked products of du Pont de Nemours & Co., Inc.), Syton 2xFS, Syton 240 and Syton D30 from MONSANTO Inorganic Chemicals Div.; Nalco 1030 and Nalco 1034A from NALCO CHEMICAL; Snowtex Up and Snowtex OXS from NISSAN CHEMICAL INDUSTRIES; Nyacol 5050 from NYACOL PRODUCT INC; Kieselsaeure D17 and Kieselsaeure X197 from DEGUSSA; Sylojet 4001 from GRACE GmbH; and Highlink Nano G502 31 liq from CLARIANT. Colloidal silica remains recommended as a selected type of silica, particularly suitable for use in the precoat layer of the panel according to the present invention.

In the precoat layer of the panel according to the present invention any pigment in finely divided particulate form, i.e. in form of particles on micron-, submicron- or even nano-scale can be employed. White pigments are known to be acting as reflecting pigments, as e.g. titanium dioxide, whereas black pigments are known to be acting as absorbing such as e.g. "carbon black". With the right choice of the particle size, the covering power of the pigment can be addressed, as an increased specific surface for smaller pigments provides an increased covering power, or, in that lower amounts of pigments are required in order to get the desired pigment density. Consequently the amount of pigment included in the composition may vary over a large range. Moreover the smaller the particle size, the more durable to abrasion the coating will be. With a smaller particle size, the coating will also be smoother. It is important that the binder composition does not contain any ingredient that may cause a shift in L*a*b* values of that layer. When having a colorless coating the composition will essentially look transparent or translucent when dried. Because the particles may be irregular in size and shape, the surfaces of coatings made from compositions containing such particles may be rough or coarse in character and appearance. Coatings made from such compositions having rough surface characteristics are relatively less abrasion resistant. By contrast, coatings made from compositions containing uniformly-shaped spherical particles are very smooth in character and appearance, and consequently, are much more abrasion resistant. If the composition does not contain a sufficient amount of particles, heat or radiation energy will pass through the composition without being absorbed. However the amount of pigment particles should advantageously be less than the critical pigment volume content of the composition, wherein the critical pigment volume content (or concentration) is defined as that level of pigmentation (PVC value) in a dry coating where just sufficient binder is present to fill the voids between the pigment particles. So a coating may comprise pigment particles in a broad range, as e.g. about 35% by weight and even more, provided that a weight ratio of pigment to binder remains in the range from 1/10 to 10/1.

In order to cover or mask structures, present in the support layer, as is e.g. the case with polymeric FR4 supports mentioned hereinbefore, amounts of pigment should be taken high enough in favor of the desired properties of the panel.

With respect to the average particle size of the inorganic fine particles, when the diameter is smaller than 0.1 µm, dispersibility degrades extremely and agglomeration of the particles occurs, so that troubles are liable to occur during the production process, as coarse protrusions and poor gloss. When it is larger than 3 µm, the surface of the precoat becomes coarse, and the gloss deteriorates disadvantageously. As pigments silica-alumina alloy particles, having a diameter of up to about 3 µm are useful, as well as barium sulphate, barium titanate, inert silica-alumina ceramic material, synthetic clay (although care should be taken in view of coating compositions containing high loadings of clay which tend to be very viscous), strontrium titanate, zinc oxide, titanium dioxide, and silicium dioxide, however not being limited hereto. Barium sulfate, titanium dioxide, calcium carbonate or silicon dioxide are preferred, for example. These can be used alone or in combination of two or more. Illustrative examples of titanium dioxide include rutile-type titanium dioxide and anatase-type titanium dioxide. Use of the rutile-type above the anatase-type titanium dioxide may be preferable because yellowing of the film layer caused by light tends to be less and a change in color difference may be better controllable. Rutile-type titanium dioxide (having an average diameter size of 0.41 µm) may further be preferred since the degree of the gloss of the film may be improved when the dispersibility thereof is improved by making use of a fatty acid such as stearic acid or a derivative thereof. Further, it is recommended to use rutile-type titanium oxide after it has its particle diameters adjusted by use of a purification process in order to remove coarse particles before added to the desired composition.

The term "ceramic", as used hereinbefore, refers to a material made by the action of heat on earthy raw materials, in which the element silicon with its oxide and complex compounds known as silicates occupy a predominant position, to produce a crystalline inorganic particulate material bonded together in a mass by means of a glassy phase and/or a solid state sintering. The amount of ceramic particles present in the compositions of the present invention can vary widely. The upper limit is simply a function of the surface area of the particles used and the viscosity and rheological properties desired for the composition. The upper limit will be less than the critical pigment volume content (CPVC) of the composition.

Because many different types of binders can be used to prepare the present compositions, these compositions can be tailored so, to provide the most satisfying solution to the present invention.

The principal ingredients used to bind the pigment particles can be any of the natural or synthetic resins or polymers used to prepare coating compositions, such as acrylics, epoxies, phenolics, urea-formaldehydes, polyesters, varnishes, lacquers, shellacs, elastomers, and other resinous materials. Pigments may advantageously be dispersed in a suitable transparent resin binder such as polycarbonate, PMMA, polyvinyl alcohol or polyamide. Since the white pigments are the ingredients that are common to all of the present compositions, regardless of their particular end use, the binder can be any material that will hold the particles together sufficiently in order to provide the desired "color" to the layer, which should preferably be colorless, i.e. white or transparent as already indicated hereinbefore. Suitable film forming polymeric resins, as e.g. disclosed in EP-A's 1 671 805 and 1 652 686, may include organic particles such as polystyrene and polymethyl methacrylate; silicones; melamine-formaldehyde condensation polymers; urea-formaldehyde condensation polymers; polyesters; polyurethanes; polyesterurethanes; polyamides; copolymers of vinylidene chloride such as vinylidene chloride/acrylonitrile/acrylic acid terpolymers or vinylidene chloride/methyl acrylate/itaconic acid terpolymers; homopolymers and copolymers of acrylates, methacrylates, vinylhalogenides, vinylacetate, styrene, acrylonitrile, olefines; cellulose and derivatives thereof; gelatin; polysaccharides; rubber like polymers based on butadienene and isoprene. Suitable film forming polymeric resins are producible with monomers selected from the group consisting of acrylates, methacrylates, vinyl esters, acrylic acid, methacrylic acid, itaconic acid, vinylidene chloride, polyisocyanates, aromatic polycarboxylic acids and polyols.

Polymer resin binders are used as a pigment stabilizers or dispersants, in order to obtain a stable dispersion of the pigment(s) in the precoat layer. Suitable resins are the petroleum type resins as e.g., styrene type, acryl type, polyester, polyurethane type, phenol type, butyral type, cellulose type, and rosin); and the thermoplastic resins as e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse 32000 and Solsperse 39000 available from AVECIA, EFKA 4046 available from EFKA CHEMICALS BV, Disperbyk 168 available from BYK CHEMIE GmbH. A detailed list of non-polymeric as well as some polymeric dispersants has been disclosed by MC CUTCHEON in "Functional Materials", North American Edition. Glen Rock, N.J.: Manufacturing Confectioner Publishing Co., 1990. p. 110-129.

The binder composition should have an index or refraction greater than that of the pigment particles, but differing not more than 20%, and more preferably not more than 10%.

The binder compositions may also contain any of the conventional additives and modifiers inclusive for initiators and/or curing agents, provided that the layer is not colored and does not get colored after heating, i.e. after its preparation (wherein the coated layer is e.g. heated at 170° C. during a time of 2 hours, and/or while vaporized phosphor raw materials are deposited thereupon, wherein the deposition temperature is at the time said vapor depositing step starts while opening a shutter, a start temperature is measured on and registered by means of a thermocouple, positioned close to the backside of said support, of less than 250° C., but not less than 80° C., and wherein at the time said vapor depositing step ends by closing a shutter, an end temperature as measured on and registered by means of a thermocouple, positioned close to the side of said support where vapor becomes deposited, is increasing not more than 90° C. between starting and ending said vapor depositing step.

In the embodiment of the present invention wherein the composition is substantially transparent or translucent, such a composition is prepared by employing a binder material having an index of refraction greater than the index of refraction of the pigment present in finely divided form. Upon mixture of the pigment with a binder material such as a resin having a greater index of refraction, opalescent material is obtained which dries to a substantially transparent or translucent material. The compositions should be formulated in order not to contain any ingredient that would increase the opacity of the composition. In case of a translucent layer it is preferred that the support surface is white.

Otherwise the organic precoat layer as a support cover layer may further be colored with a dye or, alternatively, the pigment may be colored. In the case wherein the dye is a cyan dye, absorption of stimulating laser light occurs, whereas blue light, emitted upon stimulation, becomes reflected, thereby providing a higher sensitivity. In favor of sharpness, in order to fulfill the requirement to prevent scattering of irradiation or rays which have a stimulating energy for the storage phosphors coated in the phosphor layer(s) of the storage panel according to the present invention, the coating in the organic precoat layer of a colorant having an absorption as high as possible in the wavelength range of the stimulating rays and an absorption as low as possible in the wavelength range of the radiation emitted upon stimulation may thus be additionally applied, such as is the case with triarylmethane dyes which may advantageously be applied.

In the embodiment wherein the organic precoat layer is applied on a reflecting, mirror-like support layer, as e.g. an aluminum layer having low roughness $R_a$ as in the range from 0.01 to 0.30 (preferably up to 0.15 and even up to 0.10 only) or as a vacuum-deposited aluminum layer, said precoat layer can be made of a material having high translucency, thus providing ability to take profit of high thermal conductivity of the support surface thereof and of reflection of the heat radiated from outside during exposure and read-out of the storage phosphor screen when receiving radiation energy during exposure and read-out. Radiation heat absorption and homogeneous heat dissipation in the precoat layer thus avoids at random layer cracking and contributes to a better image quality. It is important that the translucency, i.e. the transparent state, or the scattering of the organic precoat layer becomes not impaired by the organic binder material.

In principle it is possible to provide the support with a white polyester film as a precoat layer which retains practically satisfactory reflectivity with respect to the visible light range, wherein inorganic fine particles are added in a high concentration and which is stable against a dimensional change caused by heat generated from a light source. Such a polyester film as an organic precoat preferably has a composition which comprises a copolyester and 30 to 50 wt % of inorganic fine particles based on the composition, showing a thermal shrinkage at 85° C. in longitudinal and transverse directions of not higher than 0.7% and a thermal shrinkage at 150° C. in the longitudinal and transverse directions of not higher than 5.0%, and showing an average reflectance at a wavelength of 400 nm to 700 nm of not lower than 90%. "Thermal shrinkage" is determined by following test: a film sample was kept in an oven set at 85° C. and 150° C. in an atonic state for 30 minutes, the distance between reference points between before and after the heat treatment was measured, and thermal shrinkages (thermal shrinkage at 85° C. and thermal shrinkage at 150° C.) were calculated by use of the following formula: % thermal shrinkage=((L0−L)/L0)× 100 wherein "L0" stands for the "distance between reference points before heat treatment" and "L" stands for "distance between reference points after heat treatment".

Ability of the polymer to crosslink with crosslinking agents during a thermal cure provides coatings with enhanced thermal and humidity resistance. The resulting crosslinked polymer advantageously stabilize the binder matrix of the precoat layer, raise the Tg, increase the chemical resistance and the thermal stability of the cured coating compositions.

Cross-linkable polymers as binders in the precoat layers of panels according to the present invention are selected from the group consisting of polyvinyl chloride (PVC), polyvinylidene fluoride (PVDF), polyethylene terephthalate (PET), polyacrylates, polyamides, thermoplastic elastomers, and mixtures thereof. Use of e.g. a crosslinkable PNB (poly norbornene) polymer in a composition provides important performance advantages over corresponding non-crosslinkable PNB type polymers, as e.g. the ability to provide coatings with enhanced thermal and humidity resistance. The resulting crosslinked polymer effectively stabilizes the binder matrix, raises the Tg, increases chemical resistance and increases thermal stability. Cross-linkable rubbers are not excluded as e.g. natural rubbers, fluoropolymers, silicone rubbers, polyisoprene and chlorosulphonyl rubbers, without however being limited thereto. Co-agents or crosslinking activators may be used to increase the crosslinking efficiency of the peroxide, as crosslinking agent particularly suitable for use in the crosslinking step, as there are e.g. the commercially available triallylcyanurate, triallylisocyanurate, trimethylolpropanetrimethacrylate, ethyleneglycoldimethacrylate, m-phenylene dimaleimide and 1,2-cis-polybutadiene.

Crosslinkable co-polymers suitable for use as binders in the precoat layer of the panel according to the present invention e.g. are methyl (meth)acrylate ethylene glycol di(meth) acrylate copolymer, methyl (meth)acrylate triethylene glycol di(meth)acrylate copolymer and copolymer of methyl (meth) acrylate and a butadiene-based monomer.

Useful radiation curable compositions for forming an organic coating layer onto the support of the phosphor panel according to the present invention contain as primary components:

(1) a crosslinkable prepolymer or oligomer,
(2) a reactive diluent monomer, and in the case of an UV curable formulation
(3) a photoinitiator.

Examples of suitable prepolymers for use in a radiation-curable composition applied according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in EP-A 0 207 257 and Radiat. Phys. Chem., Vol. 33, No. 5, p. 443-450 (1989). The latter liquid co-polyesters are substantially free from low molecular weight, unsaturated monomers and other volatile substances and are of very low toxicity (ref. the journal "Adhasion" 1990 Heft 12, page 12). In DE-A 2838691 the preparation of a large variety of radiation-curable acrylic polyesters is given. Mixtures of two or more of said prepolymers may be used. A survey of UV-curable coating compositions is given e.g. in the journal "Coating" 9/88, p. 348-353.

When the radiation-curing is carried out with ultraviolet radiation (UV), a photoinitiator should advantageously be present in the coating composition to serve as a catalyst in order to initiate the polymerization of the monomers and their optional cross-linking with the pre-polymers resulting in curing of the coated protective layer composition. A photosensitizer for accelerating the effect of the photoinitiator may be present. Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethyl-benzoate; acetophenone series compounds such as acetophenone, trichloroacetophenone, 1,1-dichloroacetophenone, 2,2-diethoxyaceto-phenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; aminoketones which carry at least one hydroxyl or ether group on the aromatic nucleus, etc.

A particularly preferred photoinitiator is 2-hydroxy-2-methyl-1-phenyl-propan-1-one which product is marketed by E. Merck, Darmstadt, Germany under the tradename DAROCUR 1173. The above mentioned photopolymerization initiators may be used alone or as a mixture of two or more. Examples of suitable photosensitizers are particular aromatic amino compounds as described e.g. in GB-A's 1,314,556 and 1,486,911 and in U.S. Pat. No. 4,255,513 and merocyanine and carbostyryl compounds as described in U.S. Pat. No. 4,282,309. In case of photo curing, as e.g. electron beam curing, no photo initiator is required. The photo-curable composition is prepared in form of a solution in order to provide a layer-forming formulation, providing ability for the precoat layer to be coated. The layer-forming formulation thus prepared, appears in form of a dried layer after photo or electron beam curing.

The said dried layer obtained after photo or electron beam curing has a thickness of at most 30 μm, preferably in the range from 1 μm to 15 μm, and even more preferably in the range from 2 μm to 6 μm. An example of a photo-curable or electron beam curable composition suitable for use in the present invention comprises (1) a polymer or copolymer and (2) a (meth)acrylate type monomer.

More in particular a (meth)acrylate type monomer having more than one (meth)acrylate group per monomer molecule and at least one ethylene oxy group 'per (meth)acrylate group in said monomer is advantageously applied. Without being limitative a cellulose ester is recommended as a polymer. Another example of a photo-curable or electron beam curable composition suitable for use in the present invention comprises a polymer or copolymer and a (meth)acrylate type monomer. More in particular a (meth)acrylate type monomer with more than one (meth)acrylate group per monomer molecule and two or more ethylene oxy groups per (meth)acrylate group in said monomer is advantageously applied. Without being limitative a polymethyl methacrylate or a copolymer thereof is recommended as a polymer.

In a particular embodiment the binder of the support covering precoat layer in the storage phosphor panel according to the present invention comprises an acrylate type polymer as a binder. More particularly said binder comprises an urethane acrylate. A coating dispersion is prepared therefore, composed of a urethane acrylate oligomer and an acrylate oligomer, which both, together, form the binder of the said protective layer and which are present in a ratio by weight of at least 2:1, more preferably about 7:3 and which together represent at least 80%, and even up to 90% by weight of the total amount of the precoat layer. Well-known urethane acrylate and acrylate oligomers are GENOMEER T1600, trade name product from RAHN, Switzerland, and SERVOCURE RTT190, trade name product available from SERVO DELDEN BV, The Netherlands. A flow modifying agent, a surfactant and a photo initiator are further added, together with the white pigment, the presence of which is essential in order to reach the objects of the present invention.

Further in the precoat layer of the panel according to the present invention, said polymeric binder is at least one member selected from the group consisting of vinyl resins, polyesters, polyurethane resins and thermoplastic rubbers (like e.g. KRATON rubbers, more particularly KRATON FG 1901, trademarked product from SHELL, The Netherlands). Thermoplastic rubber binders are advantageously used as non-cross-linkable polymers, because those rubbery binders are preferably chosen as allowing a high volume ratio of pigment to binder. In that case a small amount of binding agent does not result in brittle layers and minimum amounts of binder in the precoat layer give enough structural coherence to the layer.

A mixture of one or more thermoplastic rubber binders may be used in the precoat layer: preferably the binding medium substantially consists of one or more block copolymers, having a saturated elastomeric midblock and a thermoplastic styrene endblock, as rubbery and/or elastomeric polymers. Particularly suitable thermoplastic rubbers, used as block-copolymeric binders in phosphor screens in accordance with the present invention are the KRATON-G rubbers, KRATON being a trade mark name from SHELL, The Netherlands.

As a basic agent di-p-xylylene composition sold by the Union Carbide Co. under the trademark "PARYLENE" is commercially available, besides the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation. Moisture resistance is about the same as the moisture resistance of "PARYLENE C" as has been taught in the note about "High Performance Coating for Electronics Resist Hydrocarbons and High Temperature" written by Guy Hall, Specialty Coating Systems, Indianapolis, available via www.scscookson.com. Technology Letters have also been made available by Specialty Coating Systems, a Cookson Company, as e.g. the one about "Solvent Resistance of the parylenes", wherein the effect of a wide variety of organic solvents on parylenes N, C, and D was investigated. Most well-known parylene-type polymers are poly(p-2-chloroxylylene), i.e. PARYLENE C film; poly(p-2,6-dichloroxylylene), i.e. PARYLENE D film and "PARYLENE HT", as completely fluorine substituted version of PARYLENE N).

Admixtures in the precoat layer of crosslinkable and non-crosslinkable polymers, such as, for example, polyacrylates, polystyrenes, or polyvinyl acetates, may be used in order to adjust to the desired viscoelastic (shear modulus) range.

According to the present invention, in the panel said phosphor or scintillator layer is a binderless layer, deposited by vapor deposition of raw materials selected from the group consisting of one or more matrix compound(s), one or more dopant compound(s) and a combination thereof, aligned in parallel, having needle-shaped form and oriented under an angle in a range between 60° and 90° with respect to said glass support. As matrix compound(s) alkali metal halide salts and as dopant(s) lanthanides or non-matrix monovalent ions are preferred, in order to prepare a lanthanide doped alkali metal halide phosphor such as e.g. CsBr:Eu or a scintillator such as e.g. CsI:Na, CsI:Tl and RbBr:Tl, without being limited thereto.

As a result, apart from avoiding cracking while vapor depositing the phosphor onto the organic precoat layer, the objects of the present invention are attained, notwithstanding frequently repeated use for a long term, thereby causing repeated heating and cooling cycles and, as a consequence thereof, an increasing risk of cracking of the layers.

While the present invention will hereinafter be described in connection with preferred embodiments thereof, it will be understood that it is not intended to limit the invention to those embodiments.

EXAMPLES

Following aluminum supports were used for the Needle Image Plates (NIPs) in the respective series of experiments:

"ALANOD 318G2" aluminum having a thickness of 0.3 mm (300 µm), commercially available from ALANOD (series 1 with CB738112 and CB738121 precoats; series 2 with CB74052, CB73949 and CB74059 precoats for NIP8138008 AND NIPs 8140020, 8139013 and 8140020 respectively); having a roughness Ra value as measured with a perth-o-meter in the range from 0.033 µm to less than 0.046 µm.

An aluminum layer support having a thickness of 800 µm and having magnesium in an amount of 3 wt %—called AlMg3—in all of the plates (i.e. series 3 with CB74238, CB74239, CB74241 and CB74243; and series 4 with CB74286 and CB74287 respectively), wherein said aluminum layer was chromium anodized. Chromium anodization treatment was performed in order to get an anodized support providing good anticorrosion properties. AlMg3G22 stands for an aluminum support having 3 wt % of magnesium, available from AALCO METALL, Henstedt-Ulzburg, Germany; anodized by STN (Surface Treatment Netherlands, Battenweg, Maasbracht, The Netherlands). Such supports had an average Ra value of ±0.33 µm.

Said chromium anodization treatment was performed in order to get an anodized support providing good anticorrosion between said support and organic precoat formed thereupon.

Precoat layers comprising an organic polymer and a pigment were following as summarized in Table 1.

Further in the Table 1 ratios of pigment to binder have been given.

CsBr:Eu photostimulable phosphor screens were prepared by vapor deposition in a vapor deposition apparatus onto the precoated anodized aluminum plates as given in the Table 1.

In the vacuum chamber of the vapor deposition apparatus the phosphor was deposited by means of a thermal vapor deposition process, starting from a mixture of CsBr and EuOBr as raw materials. Said deposition process onto said precoated anodized aluminum supports was performed in such a way that said support was rotating over the vapor stream. An electrically heated oven and a refractory tray or boat were used, in which 160-200 g of a mixture of CsBr and EuOBr as raw materials in a 99.5%/0.5% CsBr/EuOBr percentage ratio by weight were present as raw materials to become vaporized. As a crucible an elongated boat having a length of 100 mm was used, having a width of 35 mm and a side wall height of 45 mm composed of "tantalum" having a thickness of 0.5 mm, composed of 3 integrated parts: a crucible container, a "second" plate with slits and small openings and a cover with slit outlet. The longitudinal parts were fold from one continuous tantalum base plate in order to overcome leakage. Under vacuum pressure (a pressure of $2 \times 10^{-1}$ Pa equivalent with $2 \times 10^{-3}$ mbar) maintained by a continuous inlet of argon gas into the vacuum chamber, and at a sufficiently high temperature of the vapor source (720° C.) the obtained vapor was directed towards the moving sheet support and was deposited thereupon successively while said support was rotating over the vapor stream. Said temperature of the vapor source was measured by means of thermocouples present outside and pressed under the bottom of said crucible and by tantalum protected thermocouples present in the crucible.

The anodized aluminum support [ALANOD 318G2 having a thickness of 300 μm and the AlMg3G22 having a thickness of 800 μm], a width of 10 cm and a length of 10 cm, was positioned at the side whereupon the phosphor should be deposited at a distance of 22 cm between substrate and crucible vapor outlet slit.

Plates were taken out of the vapor deposition apparatus after having run same vapor deposition times, leading to phosphor plates having phosphor layers of about equal thicknesses.

A protective sheet was further coated and the adhesive strength of the phosphor layer onto the anodized aluminum support was further tested. In each case it was clear that the adhesiveness of the protective coating onto the phosphor layer was at least as strong as the adhesiveness of the phosphor layer onto the anodized aluminum support for each phosphor screen.

"C.W." stands for the phosphor coating weight and is given in mg/m$^2$.

Relative speed were set out in the Table 1, wherein relative speed (SAL %) was defined as the speed of each of the screens compared with the reference speed of an MD10® reference photostimulable phosphor screen manufactured by Agfa-Gevaert, Mortsel, Belgium. It is clear that a higher figure is indicative for a higher screen speed. Sharpness was evaluated as "MTF1", measured at 1 lp/mm. It is clear that a higher figure is indicative for a better image sharpness.

"P/B" stands for pigment to binder ratio, in the precoat.

As pigments following were used in the experiments:
    TiO2: rutile-type Ti-Pure R-900 from DuPont as a white pigment;
    MK8363 as Carbon Black absorbing pigment from NIPPON SHOKUBAI, Tokyo, Japan;
    zinc phosphate, known as an anticorrosion pigment, under the trade name NUBIROX®, available from NUBIOLA, Spain;
    LAPONITE RDS: synthetic clay from LAPORTE;
    AEROSIL SiO$_2$: silicium dioxide, from DEGUSSA.

As binders "cellite" (cellulose acetobutyrate) and "ebecryl" (multifunctional acrylate monomer) mixtures were used in the experiments, in the absence of an initiator (avoiding yellowing):

CEL2/EB refers to low viscous CELLITE CAB-381-2 and EBECRYL, whereas CEL20/EB stands for high viscous CELLITE CAB-381-20, in a mixture with EBECRYL, CAB-381-2 and CAB-381-20 being available from EASTMAN CHEMICALS, USA;

As multifunctional acrylate monomer EBECRYL 170; aliphatic urethane hexaacrylate monomer EBECRYL 1290; and alifatic urethane triacrylate EBECRYL 264 are known as trade names from UCB S.A., Belgium.

Adhesion of the layers was evaluated during handling of the rigid precoated aluminum plates: for all of the plates a sufficient adhesion was found during a test having following steps:

(1) removing the vapor deposited phosphor plate from vacuum chamber in the vapor depositing apparatus;

(2) application of identification means to the plate by inscription.

Cracks were evaluated visually when looking to the phosphor layer in particular and, in addition when looking at the surface layer of the plate.

Figures given to the "cracks" in Table 1 are related with
    absence (0);
    presence of fine cracks at some sites as observed by SEM photographs (1);
    presence of fine cracks over the surface, visible with a lens at a magnification with a factor of 8 (2);
    becoming visible for the eye as fine cracks in the "flat field" (3) or
    complete cracking and showing coarse cracks over the surface, being visible very well in the flat-field (4).

Further in the Table 1 "ACPIG" stands for "anti-corrosion pigment" zinc phosphate, identified above as having trade name NUBIROX®, available from NUBIOLA, Spain.

The needle image plate supports in the series EB1* have been coated with a precoat, wherein EBECRYL has been added after directly to the mix, just before coating, as normally performed.

The needle image plates NIP's in the series EB2** have been coated with a precoat, wherein CELLIT and EBECRYL have been mixed and homogenized on a "rollerbank" homogenizer for 7 days.

Observations of cracks were made via SEM and in "flat field". The term "flat field" should be understood herein as "uniformly exposed", i.e. exposed with a constant intensity and with a homogeneous energy distribution over the active area of the NIP, wherein in a standard procedure use is made therefore of RQA 5 (International Electrotechnical Commission—IEC61267:1994) beam quality.

It becomes clear from the experimental results, summarized in the Table 1 hereinafter, that cracks were absent in the case that enough pigment was present in the polymer precoat.

In view of sensitivity a pigment to binder ratio should at least be in the range from 1/10-10/1, and more preferably have a value of about 1/5-5/1.

In the case wherein use is made of lower amounts of pigment(s) in the precoat layer, an increased amount of crosslinkable organic polymer binder is required.

When the pigment to binder ratio is about 1/1, a good crack resistance is obtained, if compared with results obtained with higher ratios as e.g. 20/1, provided that cross-linkable polymers are present in the precoat layer.

TABLE 1

| NIP | SUPPORT | PRECOAT | PIGMENT | P/B | CRACKS | SAL % | MTF1 | C.W. |
|---|---|---|---|---|---|---|---|---|
| 8146061 | | EB1* | | | | | | |
| CB74656 | ALANOD 318G2 | CEL2/EB 10/4 | NO | 0 | 2 | 229 | .687 | 43.7 |
| CB74650 | ALANOD 318G2 | CEL2/EB 12/8 | TiO2 | 1.0 | 1 | 292 | .696 | 43.5 |
| CB74651 | ALANOD 318G2 | CEL20/EB 12/8 | TiO2 | 1.0 | 1 | 292 | .705 | 43.7 |
| 8145053 | | EB2** | | | | | | |
| CB74561 | N0161/1 318G2 | CEL2/EB 10/4 | NO | 0 | 2-3 | 240 | .645 | 44.7 |
| CB74554 | N0154/1 AlMg3 | CEL2/EB 12/8 | TiO2 | 0.2 | 1-2 | 225 | .696 | 44.7 |
| CB74555 | N0154/2 AlMg3 | CEL2/EB 12/8 | TiO2 + Carbon Black | 1.0 | 1 | 302 | .691 | 44.0 |
| 8149077 | AlMg3 | EB1* | | | | | | |
| CB74984 | N0219/11 | CEL2/EB 12/8 | TiO2 | 1.0 | 1 | 652 | .575 | 132.8 |
| CB74985 | N0219/12 | CEL2/EB 12/8 | SiO2 | 1.0 | 1 | 410 | .675 | 132.5 |
| CB74986 | N0219/13 | CEL2/EB 12/8 | TiO2 + Carbon Black | 1.0 | 1 | 449 | .671 | 133.1 |
| CB74987 | N0219/11 | CEL2/EB 12/8 | LAPONITE RDS | 1.0 | 1 | 459 | .643 | 133.1 |
| CB74988 | N0219/11 | CEL2/EB 12/8 | LAPONITE RDS | 1.0 | 1 | 468 | .642 | 132.4 |
| CB74989 | N0219/11 | CEL2/EB 12/8 | ACPIG | 1.0 | 1 | 391 | .665 | 133.0 |
| CB74991 | N0219/13 | CEL2/EB 12/8 | TiO2 + Carbon Black | 1.0 | 1 | 320 | .715 | 132.7 |

EB1*: after homogenization
EB2**: mixture after 7 days "rollerbank"

An enhanced TiO$_2$ (Ti-Pure R-900®)/(Cellite+Ebecryl 1290) ratio of 3/1 was further coated (dry thickness 10 μm and 5 μm for the two coatings respectively) onto a sulfuric acid anodized aluminum layer, having a thickness of 3 μm, i.e. without making use of chromic acid in the anodization step. Results are shown in Table 2 hereinafter.

TABLE 2

| NIP | SUPPORT | PRECOAT | PIGMENT | P/B | CRACKS | SAL % | MTF1 | C.W. |
|---|---|---|---|---|---|---|---|---|
| 8146064 | AlMg3 H$_2$SO$_4$ anodized 3 μm thick | EB1* | | | | | | |
| CB74705 | N0219/12 | CEL20/EB 12/8 | TiO2 | 3.0 | 1 | 598 | .633 | 175.0 |
| CB74706 | N0219/13 | CEL20/EB 12/8 | TiO2 | 3.0 | 1 | 572 | .572 | 183.0 |

The phosphor layer, coated now in an amount of 170-190 mg/cm$^2$ of CsBr:Eu as for GENRAD®, was showing a very good adhesion and not any visual crack appeared, as can be concluded from the data, summarized in Table 2 above.

As an effect of the present invention an increased resistance against cracking in the boundary layer between support and phosphor or scintillator layer is observed, resulting in an improved screen structure noise and an improved image quality.

Having described in detail preferred embodiments of the current invention, it will now be apparent to those skilled in the art that numerous modifications can be made therein without departing from the scope of the invention as defined in the appending claims.

What is claimed is:

1. A radiation image phosphor panel comprising as a layer arrangement of consecutive layers: a support, a precoat layer and a phosphor layer comprising needle-shaped phosphor crystals, wherein said precoat layer comprises as a binder an organic cross-linkable monomer, oligomer, polymer or a mixture thereof and a pigment in a weight ratio of pigment to binder in the range from 1/10 to 10/1.

2. Panel according to claim 1, wherein said ratio is in the range from 1/2 to 10/1.

3. Panel according to claim 1, wherein said ratio is in the range from 1/1 to 5/1.

4. Panel according to claim 1, further comprising an organic non-cross-linkable polymer in said precoat layer.

5. Panel according to claim 1, wherein said pigment is selected from the group consisting of a powder phosphor, $SiO_2$, a silicate, an aluminate, alumina, alumina hydrate, aluminum trihydroxide, $TiO_2$, a titanate, a borate, a carbonate, a sulphate, a sulfide, a phosphate, an aluminate, ZnO, a clay, a zeolite, $ZrO_2$, a zirconate, carbon black, polymer particles and combinations thereof.

6. Panel according to claim 5, wherein said powder phosphor is a lanthanide doped alkali metal halide phosphor, a lanthanide doped alkaline earth metal halide phosphor, a lanthanide doped oxysulphide of another lanthanide or a combination thereof.

7. Panel according to claim 1, wherein said cross-linkable monomer is selected from the group of monomers consisting of an epoxy, an acrylate, a methacrylate, a silicone, a siloxane, a siloxazane, a urethane, an isocyanate, an anhydride, an oxime, an allyl, a styrenic, a nitrile, an amide, an imide, a vinyl, an aldehyde, an amine, an azine, an epoxide, a quinoline, an active olefin, a pyridinium, an azolium, an azoline monomer and combinations thereof.

8. Panel according to claim 7, wherein said organic cross-linkable polymer is selected from the group consisting of cellite, poly-acrylate, poly-methyl-methacrylate, poly-methylacrylate, polystyrene, polystyrene-acrylonitrile, polyurethane, hexafunctional polyacrylate, poly-vinylidenedifluoride, silane-based polymers, epoxy functionalized polymers and a combination thereof.

9. Panel according to claim 7, wherein said organic cross-linkable polymer is present in form of a mixture of cellite and ebecryl.

10. Panel according to claim 9, wherein a ratio by weight of cellite to ebecryl is in the range from 5:1 to 1:5.

11. Panel according to claim 1, wherein said support is selected from the group consisting of aluminum, an aluminum alloy, titanium, a titanium alloy, and a combination thereof.

12. Panel according to claim 1, wherein said support is multilayered, comprising a polymeric sublayer, aluminum, and a material selected from the group consisting of an aluminum alloy, titanium, a titanium alloy, and a combination thereof.

13. Panel according to claim 12, wherein said polymeric sublayer is a plastic laminate layer or a fiber reinforced epoxy resin layer.

14. Panel according to claim 1, wherein said needle-shaped phosphor crystals, present in a vapor deposited binderless layer, originate from raw materials selected from the group consisting of one or more matrix compound(s), one or more dopant compound(s) and a combination thereof, aligned in parallel and oriented under an angle in a range between 60° and 90° with respect to said precoat layer and wherein as matrix compound(s) alkali metal halide salts and as dopant(s) lanthanides or nonmatrix monovalent ions are present.

15. Panel according to claim 1, wherein said needle-shaped phosphor is a CsBr:Eu phosphor.

16. Method of preparing a radiation image phosphor panel comprising as a layer arrangement of consecutive layers: a support, a precoat layer and a phosphor layer comprising needle-shaped phosphor crystals, wherein said precoat layer comprises as a binder an organic cross-linkable monomer, oligomer, polymer or a mixture thereof and a pigment in a weight ratio of pigment to binder in the range from 1/10 to 10/1 wherein said precoat layer is coated by a technique selected from the group consisting of roller coating, knife coating, doctor blade coating, spray coating, sputtering, physical vapor depositing, chemical vapor depositing and laminating.

17. Method of preparing a radiation image phosphor panel according to claim 16, wherein said phosphor layer is coated by a technique selected from the group consisting of physical vapor deposition, chemical vapor deposition and an atomization technique.

18. Method of preparing a radiation image phosphor panel comprising as a layer arrangement of consecutive layers: a support, a precoat layer and a phosphor layer comprising needle-shaped phosphor crystals, wherein said precoat layer comprises as a binder an organic cross-linkable monomer, oligomer, polymer or a mixture thereof and a pigment in a weight ratio of pigment to binder in the range from 1/10 to 10/1 wherein said phosphor layer is coated by a technique selected from the group consisting of physical vapor deposition, chemical vapor deposition and an atomization technique.

* * * * *